US010382589B2

(12) United States Patent
Wang et al.

(10) Patent No.: US 10,382,589 B2
(45) Date of Patent: Aug. 13, 2019

(54) INFORMATION COLLECTION AND PROCESSING METHOD, CLIENT TERMINAL AND SERVER

(71) Applicant: Alibaba Group Holding Limited, Grand Cayman (KY)

(72) Inventors: Shijiang Wang, Hangzhou (CN); Shubin Wang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 379 days.

(21) Appl. No.: 14/988,633

(22) Filed: Jan. 5, 2016

(65) Prior Publication Data

US 2016/0205219 A1    Jul. 14, 2016

(30) Foreign Application Priority Data

Jan. 8, 2015  (CN) .......................... 2015 1 0007977

(51) Int. Cl.
*G06F 15/16* (2006.01)
*H04L 29/06* (2006.01)
*H04L 29/08* (2006.01)
*H04W 4/02* (2018.01)

(52) U.S. Cl.
CPC .............. *H04L 67/42* (2013.01); *H04L 67/22* (2013.01); *H04W 4/02* (2013.01); *H04L 67/18* (2013.01)

(58) Field of Classification Search
CPC ......... H04L 67/18; H04L 67/22; H04L 67/42; H04W 4/02; H04W 64/00
See application file for complete search history.

(56) References Cited

U.S. PATENT DOCUMENTS

| 7,215,966 | B2 | 5/2007 | Joshi | |
|---|---|---|---|---|
| 8,700,057 | B2 | 4/2014 | Jovicic et al. | |
| 2007/0178909 | A1* | 8/2007 | Doyle | G01S 5/0027 455/456.1 |
| 2009/0102638 | A1* | 4/2009 | Olsen | B60R 25/1004 340/505 |

(Continued)

FOREIGN PATENT DOCUMENTS

| CN | 101938831 A | 1/2011 |
|---|---|---|
| WO | WO2014080453 | 5/2014 |

OTHER PUBLICATIONS

Translation of Chinese first Office Action dated Aug. 28, 2018 for Chinese patent application No. 201510007977.0, a counterpart foreign application of U.S. Appl. No. 14/988,633, 12 pages.

(Continued)

*Primary Examiner* — Yves Dalencourt
(74) *Attorney, Agent, or Firm* — Lee & Hayes, P.C.

(57) ABSTRACT

A client terminal receives a collection strategy from a server, collects position information according to the received collection strategy, and sends the collected position information to the server. After receiving and storing the collected position information, the server performs an analysis of the collected position information according to a preset rule to form configuration data of the collection strategy, updates the collection strategy according to the configuration data formed by the analysis, and sends the updated collection strategy to the client terminal. The client terminal receives the updated collection strategy sent by the server, and collects the position information according to the updated strategy.

17 Claims, 11 Drawing Sheets

(56) References Cited

U.S. PATENT DOCUMENTS

| | | | |
|---|---|---|---|
| 2009/0189807 A1* | 7/2009 | Scalisi | G01S 19/34 |
| | | | 342/357.57 |
| 2010/0090899 A1 | 4/2010 | Zhao et al. | |
| 2010/0234046 A1* | 9/2010 | Wood | H04W 64/00 |
| | | | 455/456.3 |
| 2012/0206297 A1 | 8/2012 | Wu et al. | |
| 2013/0219454 A1 | 8/2013 | Hewinson | |
| 2014/0338006 A1* | 11/2014 | Grkov | H04L 63/14 |
| | | | 726/35 |

OTHER PUBLICATIONS

PCT Search Report and Written Opinion dated Mar. 17, 2016 for PCT Application No. PCT/US16/12233, 12 pages.

\* cited by examiner

INFORMATION COLLECTION AND PROCESSING METHOD, CLIENT TERMINAL AND SERVER

CROSS REFERENCE TO RELATED PATENT APPLICATION

This application claims foreign priority to Chinese Patent Application No. 201510007977.0 filed on Jan. 8, 2015, entitled "Information Collection and Processing Method, Client Terminal and Server", which is hereby incorporated by reference in its entirety.

TECHNICAL FIELD

The present disclosure relates to the field of information communications, and in particular, to methods, client terminals and servers for collecting and processing information.

BACKGROUND

With the development and popularity of intelligent terminals, an increasing number of application scenarios need passive positioning technology, such as location sharing, track log and instant prompt of surrounding points of interest.

Passive positioning generally refers to a situation in which a background application of a terminal continuously collects and reports position information of a user whereas a server locates a current position of the user according to the position information reported by the terminal and sends a corresponding push message to the user. Normally, the passive positioning may be a round-the-clock location application technology that is based on content and hotspots subscribed by a user, which may obtain position information using positioning technologies such as GPS (Global Positioning System), WIFI, base stations, beacons, etc. The passive positioning is able to be operated under a variety of network conditions at all time, and can actively detect that the user is entering a subscribed hotspot and trigger a display of content of a corresponding application of the terminal. For example, the displayed content may be information of a vacant seat in a cinema that will be open after thirty minutes, discount information of some fresh food of a certain supermarket evening sale, and coupon information of a newly opened restaurant, etc.

A common solution used by existing passive positioning technologies mainly includes collecting and reporting position information at all time by a positioning application of a terminal after the application is activated. In order to obtain information of a current position of a user as accurately as possible and to satisfy a service requirement of an application scenario where the user is located, the existing passive positioning technologies typically collect position information of the user in short and fixed time intervals. This position information collection method may cause an application of a terminal to collect and report position data in a very frequent manner. This results in a large power consumption at the terminal of the user, which may even be unacceptable to the user, and greatly reduces the user experience of the passive positioning service. In addition, frequent collection and reporting of position information will also increase the network traffic consumption of the terminal. For example, a passive positioning function configured in a local service APP (Application, APP) will collect and report position data frequently after a user starts the APP, which consumes a large amount of power of the terminal, and may even cause overheating of the terminal device during the usage, and thus degrade the user experience.

Existing methods of collecting position information in passive positioning leads to a large power consumption at a terminal, having a poor user experience.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

An objective of the present disclosure is to provide a method, a client terminal and a server for collecting and processing information, which are able to optimize strategies associated with collecting and reporting position information, and save terminal power and user network traffic, thus improving user experience.

Implementations of the method, the client terminal and the server of collecting and processing information, which are provided in the present disclosure, are described as follows.

In an implementation of an information collection method, a client terminal may receive a collection strategy from a server, collect position information according to the received collection strategy, and send the collected position information to the server. The server may receive and store the collected position information, perform an analysis of the collected position information according to a preset rule to form configuration data of the collection strategy, update the collection strategy according to the configuration data formed by the analysis, and send the updated collection strategy to the client terminal. The client terminal may then receive the updated collection strategy sent from the server and collect the position information according to the updated strategy.

In implementations, an information collection method may include a client terminal receiving a collection strategy sent by a server; the client terminal collecting position information according to the received collection strategy; the client terminal sending the collected position information to the server; and the client terminal receiving an updated collection strategy from the server and collecting the position information according to the updated strategy.

In implementations, a collected information processing method may include a server receiving and storing position information sent from a client terminal; the server performing an analysis of the collected position information according to a preset rule to form configuration data of a collection strategy; the server updating the collection strategy according to the configuration data formed by the analysis; and the server sending the updated collection strategy to the client terminal.

In implementations, an information collection client terminal may include a strategy receiving module configured to receive a collection strategy sent by a server; an information collection module configured to collect position information according to the collection strategy in the strategy receiving module; an information reporting module configured to send the collected position information to the server; and a strategy synchronization module configured to synchronize with the server to update the collection strategy received by the strategy receiving module.

In implementations, a collected information processing server may include an information receiving module configured to receive and store position information sent by a client terminal; a preset rule unit configured to store a preset rule that is set up in advance for analyzing the position information; a collection strategy module configured to store a collection strategy of the client terminal; a processing unit configured to execute the preset rule stored by the preset rule unit, and analyze the position information to obtain configuration data of the collection strategy; a strategy update module configured to obtain the configuration data of the collection strategy to update the collection strategy in the collection strategy module; and a strategy sending module configured to send the collection strategy stored in the collection strategy module to the client terminal.

The present disclosure provides a method, a client terminal and a server of collecting and processing information. By obtaining a collection strategy that is optimized by the server according to user behavior and habits, the client terminal is able to adjust collection times, collection intervals and collection precisions, etc., of position information of a terminal of a user timely and reasonably, thereby achieving a real-time personalization. On the other hand, by performing data analysis of the collected position information, the server is able to calculate an active time period in which a position of the user changes frequently, and to properly increase a passive positioning frequency during that active time period, while the opposite or even no collection is performed in other time periods. By learning the habits of the user, information collection in the passive positioning becomes intelligent, which gradually optimizes a configuration strategy of the position information collection, and greatly saves the power and the network traffic of the user terminal.

BRIEF DESCRIPTION OF THE DRAWINGS

In order to describe technical solutions of embodiments of the present disclosure or the existing technologies more clearly, accompanying drawings that are used for describing the embodiments or the existing technologies are briefly described herein. Apparently, the described drawings are merely some embodiments of the present disclosure. Based on these drawings, other drawings can be obtained by one skilled in the art without making any creative effort.

DETAILED DESCRIPTION

In order to make the technical solutions of the present disclosure more comprehensible to one skilled in the art, the technical solutions in the embodiments of the present disclosure are clearly and fully described hereinafter with reference to the accompanying drawings in the embodiments of the present disclosure. Apparently, the described embodiments merely represent a part rather than all of the embodiments of the present disclosure. All other embodiments obtained by one of ordinary skill in the art based on the embodiments of the present disclosure without making any creative effort shall belong to the scope of protection of the present disclosure.

Position information collected during positioning as described in the present disclosure may include position information of a user client terminal that is obtained using an internal or external GPS positioning apparatus of a terminal, the position information of the user client terminal obtaining through positioning of a mobile communication network of a mobile communication operator (such as base stations of a GSM network of 2G, a CDMA 2000 network of 3G, or an LTE network of 4G, etc.), and the position information of the user client terminal obtained based on a position identifier of a WIFI or beacon associated with a location of a hotspot. In the present disclosure, the client terminal may include a mobile phone, a tablet, a Personal Digital Assistant (PDA), a Pocket PC, a smart-wearable device (a smartwatch, a bracelet, a concealed data recording device, etc.), or other mobile terminal devices, and may additionally or alternatively include a desktop PC having a function of collecting position information.

Figure 1:
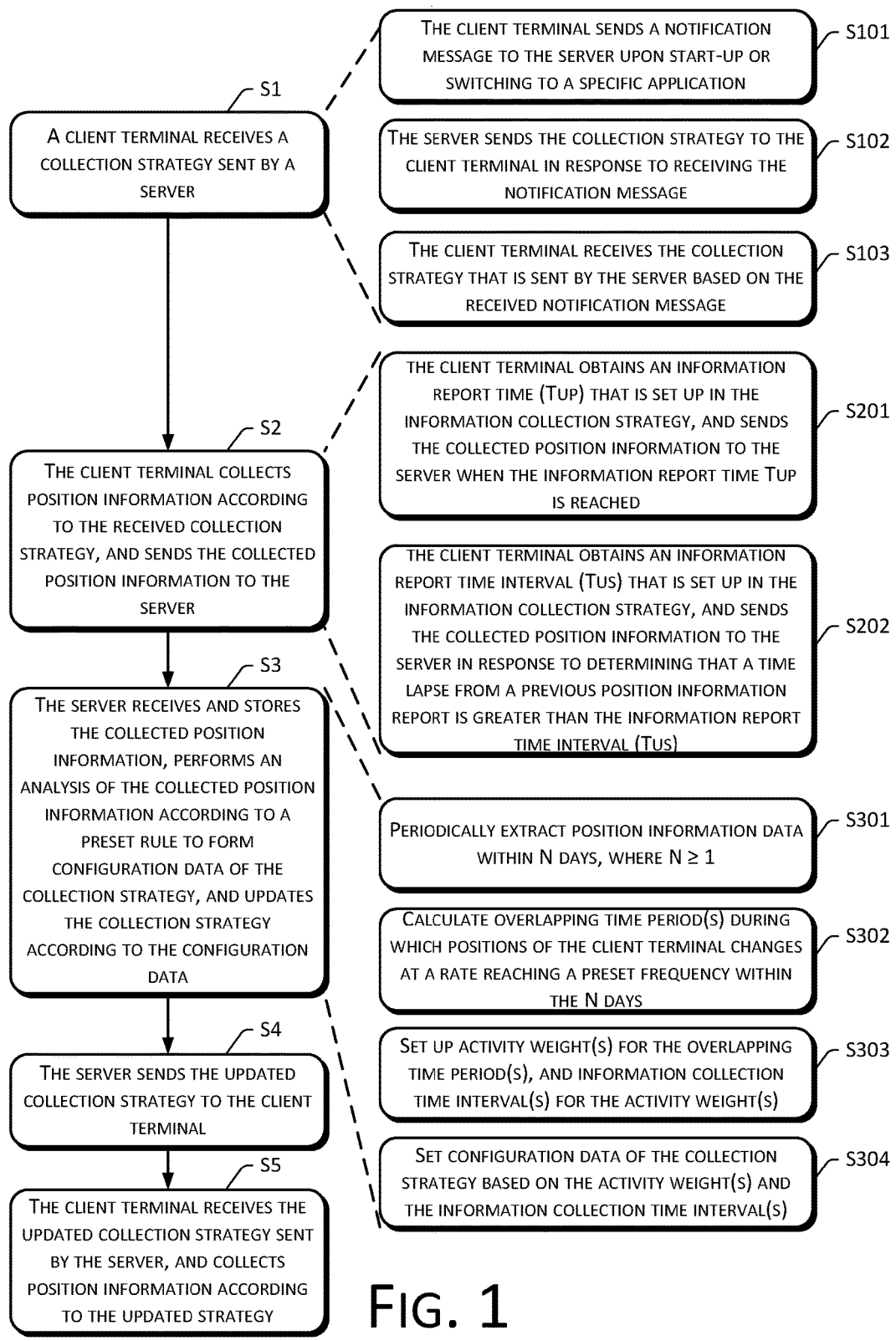
FIG. 1 is a flowchart of an information collection method according to an embodiment of the present disclosure.

Data collection of position information in a positioning function is generally used to provide corresponding position information services to a user based on a current position of the user. In a real-world application, most users have relatively stable jobs and habits, and usually have relatively stable places of activity for work or leisure in working days or weekend. Thus, collection and reporting of position information of a user may not be needed, or a frequency of collecting the position information may be decreased during a time period when a place of activity of a user is fixed, thus saving the power of a terminal of the user, and avoiding unnecessary consumption of resources. The present disclosure provides an information collection method. After a client terminal collects and reports position information, a server performs an analysis based on the collected position information to optimize an information collection strategy of the client terminal to allow a collection strategy of the position information of the client terminal to become more reasonable and thus to save the power of the client terminal. FIG. 1 shows a flowchart of an information collection method according to an embodiment of the present disclosure. As shown in FIG. 1, the method may include the following method blocks.

At S1, a client terminal receives a collection strategy sent by a server.

The collection strategy may include collection time frame(s) (abbreviated as Th), collection time interval(s) (abbreviated as Ts), and information report time(s) (abbreviated as Tup), etc., of geographical position information that are configured for the client terminal. For example, a collection time frame (Th) may be set as 24 hours, a collection time interval (Ts) may be set as one collection per hour, and information report times (Tup) may be set as 10:00 am and 10:00 pm on a daily basis in the collection strategy. Apparently, the collection strategy on the server may further be configured with other information such as a collection precision A of the geographical position information of the client terminal, a user or device identifier ID, a location area code LAC, an application version P that is applicable to the client terminal, etc. Information collection strategy that is configured in a first collection strategy may be set up according to associated requirement(s) of information collection.

Generally, before the server obtains information data collected by the client terminal or information data that is collected by the client terminal and satisfies data analysis requirement(s), the collection strategy may be a conventional strategy of information collection that has been set up in advance. In another embodiment, the collection strategy may also be a universal collection strategy that is set up to meet the habits of most users. For example, the information report time (Tup) may be set as 0:00 am at night for reporting information data that has been collected in the past 24 hours on a daily basis.

Configuration of the collection strategy may be performed in a dedicated server, or implemented by a corresponding functional module on other servers, such as a LBS (i.e., location-based service) server. In the present disclosure, the server is not limited to a physical or logical server architecture, and may include a combination of multiple physical or logical servers.

The server may send the collection strategy to the client terminal, and the client terminal may receive the collection strategy. In an implementation, the client terminal may be periodically synchronized with the server to obtain the collection strategy of the server. Therefore, in an implementation, the client terminal may receive the collection strategy sent by the server in the following approach.

At S101, the client terminal sends a notification message to the server upon start-up or switching to a specific application.

At S102, the server sends the collection strategy to the client terminal in response to receiving the notification message.

At S103, the client terminal receives the collection strategy that is sent by the server based on the received notification message.

In another implementation, the server may also send the collection strategy to the client terminal proactively after a preset push time is reached. Therefore, in an implementation, the client terminal may receive the collection strategy sent by the server in the following approach.

At S101', the server sends the collection strategy to the client terminal when a preset push time is reached (not shown).

At S102', the client terminal receives the collection strategy that is sent by the server to the client terminal when the preset push time is reached (not shown).

The client terminal sends a notification message to the server when starting or switching to specific application(s). The server sends the collection strategy to the client terminal after receiving the notification message, and the client terminal then receives the collection strategy sent by the server. The specific application(s) that is/are started or switched by the client terminal may include an installed application of position information collection on the client terminal, which may include, for example, a terminal APP that collects position information using the information collection method of the present disclosure. The client terminal may synchronize with the server to obtain the collection strategy of the server when initiating the application, or may notify the server to obtain the collection strategy of the server when a desktop or another application of the client terminal is switched to the foreground of a specific application. In another implementation, a preset push time may also be set up in advance, and the server may send the collection strategy to the client terminal proactively at fixed time(s) on a daily basis.

In another implementation of the present disclosure, the server may also push the collection strategy to the client terminal proactively.

For example, when the collection strategy needs to be updated or pushed due to other reasons, an operator may actively deliver a push trigger instruction to the server in real time. In response to receiving the push trigger instruction, the server may send the collection strategy to the client terminal. At this point, the client terminal may receive the collection strategy sent by the server based on the push trigger instruction.

S2, the client terminal collects position information according to the received collection strategy, and sends the collected position information to the server.

After obtaining the collection strategy, the client terminal may collect position information of the client terminal according to an information collection mode configured in the collection strategy. In an exemplary implementation, the position information of the client terminal may be collected with the help of a positioning SDK (Software Development Kit) and a position-change sensing application. Corresponding to different application development platforms or operating systems such as Windows, Android or iOS, the SDK or position-change sensing application may be designed accordingly. The positioning SDK may collect and obtain position information through positioning hardware and software, such as obtaining the position information via a built-in GPS or base station(s) of a mobile communication operator. The position-change sensing application may obtain motion status information of a user terminal, such as the user is currently in a stationary state or a moving state, using a combination of hardware and software that are used for sensing motion of the terminal, and obtain information such as speed, acceleration and even direction of the user motion. As such, the client terminal collects additional information related to the position of the user, and enriches the obtained position information, thus supporting and facilitating the server to perform an analysis of the habits of the user.

After collecting the position information, the client terminal sends the collected position information to the server. In the present disclosure, after collecting the position information, the client terminal may send the information to the server in real time. In an embodiment, in order to further save the power of the client terminal of the user, an information report time (Tup) or an information report time interval (Tus) may be set up in the collection strategy. The collected information data may be reported after the preset time (Tup) or time interval (Tus) is reached to reduce the number of times of reporting the information. Therefore, in an embodiment, the client terminal may send the collected position information to the server using the following approach:

At S201, the client terminal obtains an information report time (Tup) that is set up in the information collection strategy, and sends the collected position information to the server when the information report time Tup is reached; or At S202, the client terminal obtains an information report time interval (Tus) that is set up in the information collection strategy, and sends the collected position information to the server in response to determining that a time lapse from a previous position information report is greater than the information report time interval (Tus).

For example, the client terminal acquires position information through a positioning SDK and a position-change sensing application. The client terminal may store the newly collected position information data in a storage region of a cache of the client terminal, and report position information data that is stored in the cache of the terminal to the server when the information report time interval (Tus) or the preset information report time is reached, for example, via a MTOP (Mobile Taobao Open Platform) that provides a consistent API platform data interaction and service interface to client terminals and servers.

In another embodiment of an information collection method according to the present disclosure, a user switch may further be set up in the client terminal. The client terminal may collect or report information data (only) when the user switch of the client terminal is in an ON state. Therefore, in another embodiment of the present disclosure, the method may further include setting up an indicator state of whether information collection or information reporting is allowed in the client terminal. Correspondingly, collecting the position information according to the received collection strategy by the client terminal may include collecting the position information according to the received collection strategy by the client terminal in response to the indicator state obtained thereby indicating that the information collection is allowed. Additionally or alternatively, sending the collected position information to the server by the client terminal may include sending the collected position information to the server by the client terminal in response to the indicator state obtained thereby indicating that the information reporting is allowed.

The indicator state of whether the information reporting is allowed may include a status of a physical or virtual switch that is set up in the client terminal. In the present disclosure, the client terminal may be provided with two individual user switches for controlling whether the information collection is allowed and whether the information reporting is allowed respectively. Alternatively, a single user switch may be set up to control these two indicator states of whether the information collection and the information reporting of the client terminal are allowed at the same time. By setting up user switch(es) in the client terminal, the user is able to control whether the client terminal is allowed to report the collected position information via a control of a state of a user switch. In this way, the user may control whether the client terminal is allowed to collect or report the position information at any time. Furthermore, the setting of the user switch(es) provides a clear indication to the user that the user is able to control whether the client terminal is allowed to collect and report the position information, thus protecting user privacy and improving user experience.

The client terminal collects the position information according to the received collection strategy. The client terminal may send the collected position information to the server.

At S3, the server receives and stores the collected position information, performs an analysis of the collected position information according to a preset rule to form configuration data of the collection strategy, and updates the collection strategy according to the configuration data formed by the analysis.

The server may receive and store the position information collected and sent by the client terminal, cache received data using a circular queue, and store data of the received position information in a dedicated data storage device. The server may analyze the collected position information according to a preset rule to form new configuration data of the collection strategy, and optimize the collected data that is configured in the server. The preset rule may include preset methods of data processing including, for example, extracting, processing and aggregating collected information data, such as a method of analyzing a social circle and an active business circle of a user, a method of predicting a path of motion of the user, a method of calculating places and times for work, rest and entertainment of the user, etc. In an implementation, the preset rule may be set according to data processing requirement(s). The present embodiment provides preset rule(s) to the server for analyzing the collected position information, which may extract position information data of the user in one week or other periods of data calculation, and calculate overlapping time period(s) during which positions of the user change frequently on a daily basis to form new configuration data for the user client terminal to optimize the collection strategy. In an implementation, the server may analyze the collected position information according to a preset rule to form configuration data of a collection strategy using an approach as follows:

S301 periodically extracts position information data within N days, where N≥1.

S302 calculates overlapping time period(s) during which positions of the client terminal changes on a daily basis at a frequency that reaches a preset frequency within the N days based on the position information data.

S303 sets up activity weight(s) for the overlapping time period(s) that are obtained, and sets up information collection time interval(s) corresponding to the activity weight(s).

S304 sets configuration data of the collection strategy based on the activity weight(s) of the overlapping time period(s) and the information collection time interval(s) corresponding to the activity weight(s).

New configuration data is formed based on the preset rule as described above. The configuration data of the information collection strategy of the user client terminal is optimized and the collection strategy is updated based on information of changes in position of the user in a number of days. In an implementation, the updated collection strategy may include:

reducing a time interval for collecting and reporting the position information for an overlapping time period during which daily changes in positions reach the preset frequency; and increasing a time interval for collecting and reporting the position information for an overlapping time period during which daily changes in positions do not reach the preset frequency.

The client terminal may receive the updated collection strategy, update the local collection strategy, and collect position information using the updated collection strategy. For example, an information collection time interval for the client terminal may be set to be increased in a time period from 8:30 to 11:30 daily during which the user is working and a position thereof does not change actively. One collection in every hour may be set to be one collection in every two hours, or even no data collection is performed. Moreover, an information collection time interval of the client terminal may be decreased and a collection frequency is increased for a time period between 18:00 and 20:00 during which the position thereof changes dynamically. For example, collection may be carried out every half hour. Whether changes in the position reach a preset frequency may be defined according to a number of changes in the position of the user and/or distances between the changes in the position. For example, although the position of the user may change many times, the position of the user may still be set as unchanged if these changes occur without a scope of ten meters in radius. Thus, a limited power of the client terminal may be used in an effective time period in which the position changes frequently, which saves the power or network traffic of the client terminal of the user to the greatest extent while ensuring a rich and real-time data collection.

The server may periodically fetch position information data, for example, fetching position information data at 0:00 am every day or 0:00 am every Friday, and analyze the position information data according to a preset rule. Apparently, the calculated overlapping time period(s) may include a plurality of time periods, and corresponding activity weights may be assigned to the plurality of time periods according to a position change frequency. The server may set corresponding configuration data in the collection strategy according to respective weights of different time periods, for example, according to information collection time intervals and collection precisions in time periods of change corresponding to the weights. The following Table 1 is a comparison table between activity weights and information collection time intervals according to the present disclosure.

TABLE 1

Comparison Table between Activity Weights and Time Intervals

| Activity weight | Information collection time interval (in minutes) |
| --- | --- |
| 1 | 120 |
| 2 | 90 |
| 3 | 60 |
| 4 | 45 |
| 5 | 30 |
| 6 | 20 |
| 7 | 15 |
| 8 | 10 |
| 9 | 5 |

In an exemplary embodiment, the server may fetch and analyze position information data of the user within one week each time. In general, the work and study habits of most users are subject to two days off or one day off in the weekend. So, the collected position information data usually has a corresponding change pattern in accordance with the habit of the user. The server may fetch the position information data of the user within one week for analysis each time, for example, may fetch position information data collected by the client terminal from Monday to Sunday each time and then perform an analysis to obtain configuration data of the collection strategy. As such, the obtained configuration data of the collection strategy can better comply with the habit of the user, thereby achieving intelligent learning of the habit of the user. Therefore, N in the periodically extracting position information data in N days may be seven in this example.

The position information data collected by the client terminal may be transferred to a TT/Galaxy for temporary storage, and the position information data may then be generated for storage. Two pieces of position information data may be generated. One piece is stored in an ODPS ladder table for a transaction party to perform an offline analysis, large data calculation, and so on. The second piece of data may be sent to a MetaQ (Message Notification Middleware). The transaction party may perform a corresponding transaction processing after subscribing and querying data in real time. The ODPS is an Open Data Processing Service, which is a data storage and analysis platform that is constructed based on a cloud computing platform of Alibaba Group with completely independent intellectual property, and is applicable to offline processing of massive data (at TB/PB level) with a low requirement on timeliness. Apparently, it may also be stored in other servers for offline analysis and data processing in the present disclosure.

In the present disclosure, the client terminal may just collect preset data that is needed, and may not need to perform other complicated operations on the collected information data. In some service application scenarios, additional processing, such as calibration, computation, and compensation, etc., may be needed to be applied on the collected information data. In the present disclosure, the additional processing on the collected information data may be performed on the server side to reduce computation operations of the client terminal and to further reduce the power consumption of the client terminal. In another embodiment of the present disclosure, the method may further include the server performing at least one of longitude and latitude conversion, information compensation, and data format calibration on the collected position information. An exemplary process may include the following.

The longitude and latitude conversion may include converting, by the server, longitude and latitude information in the collected position information into a standard format that satisfies usage and processing requirements. For example, longitude and latitude returned by the client terminal upon collection of the position information is a WGS-84 coordinate system (worldwide, not rectified). In this case, the server may calculate and convert longitude and latitude A into longitude and latitude B in a GCJ-02 coordinate system (used in China, rectified), thus facilitating a domestic server or terminal application to process longitude and latitude information.

The information compensation may include a compensation for the position information data when some fields in the obtained position information collected by the client terminal are empty or have abnormal values. The server may perform a computation compensation via a channel for transmitting information with the client terminal or other third-party information interfaces. For example, the following Table 2 is a format of position information data collected by a client terminal.

TABLE 2

Position Information Data Collected by Client terminal

| Field | Field Description | Example |
|---|---|---|
| wgs_longitude | Longitude of WGS-84 coordinate system | 121.60259 |
| wgs_latitude | Latitude of WGS-84 coordinate system | 29.834095 |
| precision | Precision (m) | 58 |
| wifis | wifi information, multiple pieces | 28:2C:B2:B7:76:2A, true, 55, MERCURY_B7762A; D8:15:0D:2A:48:92, false, 61, MERCURY_2A4892 |
| cells | Base station information, multiple pieces | GSM, 460, 0, 19931, 22337, 0; GSM, 460, 0, 33367, 22337, 14; GSM, 460, 0, 33034, 22337, 13; |
| utdid | Usertrack Device ID, used as a unique identifier of device | UrHLar1eTMsBAK/EGynQSfDn |
| gather_time | Collection timestamps | 1410408858 |
| mac_address | Mobile phone MAC address | 2C:28:2D:23:24:97 |

In the information collection, many fields may be empty temporarily due to unpredictability of different states of the client terminal. For example, the userid is empty when the user does not log in. The longitude and latitude is empty in case of positioning timeout/positioning service shutoff due to poor GPS or network condition. The wifi/base station cannot scan a list due to a poor signal, resulting in an empty field. Moreover, many unpredictable exception flows cause a collection failure of some fields.

Figure 2:
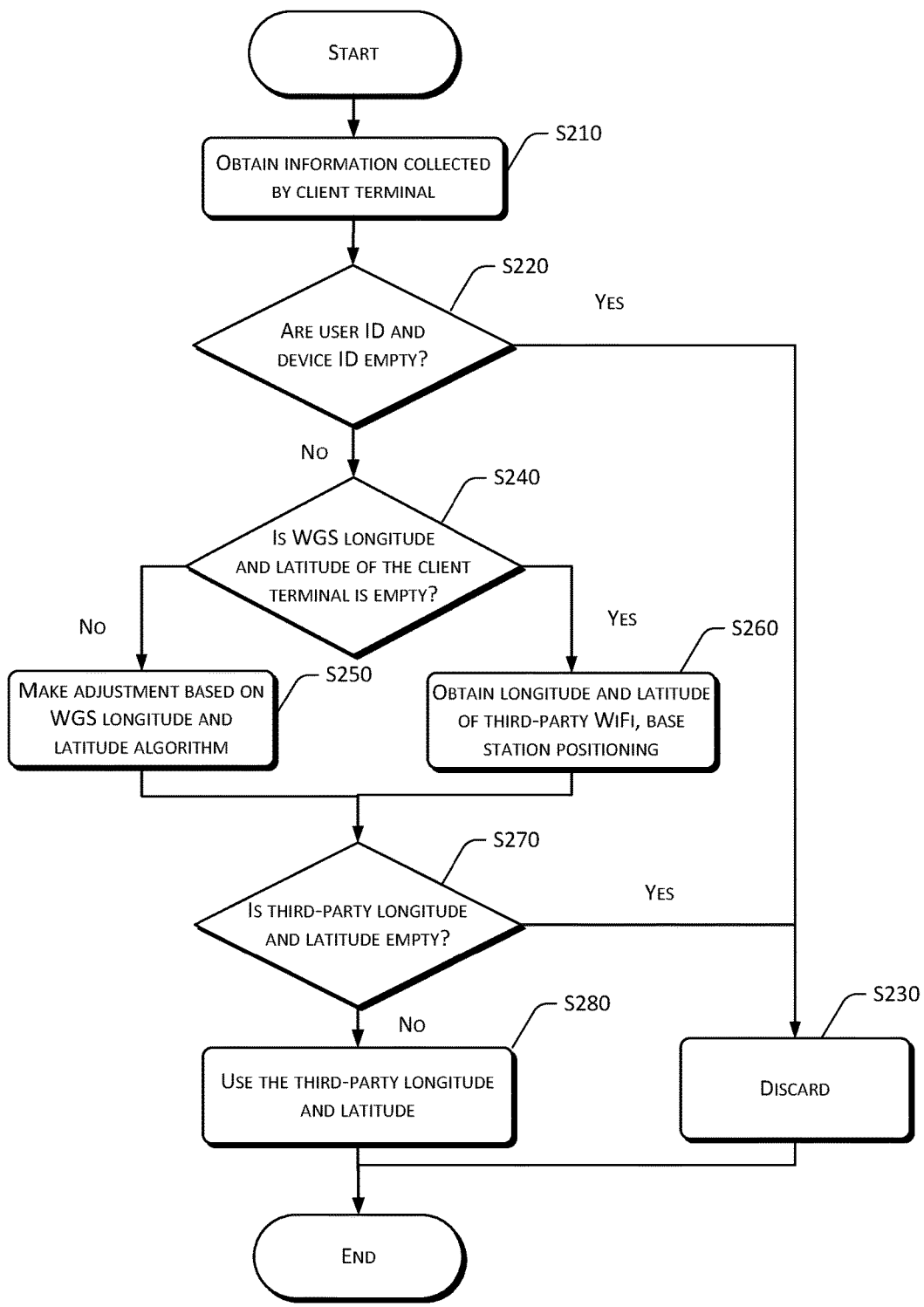
FIG. 2 is a flowchart of performing a compensation calculation of position information data according to an embodiment of the present disclosure.

The server needs to push related messages to the user according to the commercial area where the user is located. At this point, the client terminal may not need to collect and acquire information such as province/city/district/street address where the user is located. These operations are compensated by the server by invoking a third-party interface. Alternatively, when the longitude and latitude collected by the client terminal is empty, a third-party interface of an associated mobile communication operation may be invoked to compensate the longitude and latitude based on WiFi/base station list information collected by the client terminal. If the position information of the client terminal is still empty after compensation, such collection data can be discarded. When part of the device information collected by the client terminal is empty, the server may invoke a third-party interface for compensation based on a device ID. FIG. 2 is a flowchart of performing a compensated computation on position information data according to an embodiment of the present disclosure. At S210, information collected by the client terminal is obtained. At S220, a determination as to whether corresponding fields for a user ID and a device ID are empty. If both the corresponding fields for the user ID and the device ID are empty, the collected terminal is discarded at S230. If any one of the corresponding fields for the user ID and the device ID is not empty, a determination is made as to whether a field for longitude and latitude of WGS associated with the client terminal is empty at S240. If not empty, an adjustment is made thereto based on a WGS longitude and latitude algorithm at S250. If empty, longitude and latitude of a third-party WiFi or base station positioning is obtained at S260. At S270, a determination is made as to whether the third-party longitude and latitude is empty. If empty, the collected information is discarded at S230. If not empty, the third-party longitude and latitude is used at S280.

In an implementation, the client terminal reports the collected position information data, and upon communication with an associated service, may include public channels, which can provide related data associated with the client terminal, devices, etc., such that the passive positioning module of the application of the client terminal does not need to collect such pieces of public data repeatedly and frequently. This, on the one hand, avoids repeated collection of the same data, and on the other hand, simplifies the data collection operation of the passive positioning module of the client terminal to reduce power consumption. The following Table 3 is a data format of public data provided by such public channel according to the present disclosure.

TABLE 3

Public Data Provided by Public Channel

| Field | Field Description | Example |
|---|---|---|
| imei | Abbreviation for International mobile equipment identity | 862394018921415 |
| imsi | International mobile subscriber identification number | 460078152916589 |
| device_id | Mobile phone device identity, Device ID | AgzazfzyRdq16NX1fN4K Z6mMmDx1td6NWdML vagYXHz |
| userid | User Id | 2112253720 |
| app_id | Client terminal appId | 21646297 |
| app_version | Client terminal app version | 4.9.0 |
| app_channel | Client terminal app channel number | 600000 |
| platform | Client terminal app platform: Android, ios | android |
| ip | Client terminal ip address | 39.185.19.133 |

The data format calibration may include a unified format conversion, calibration, etc., performed on the collected position information. Original data formats collected by different terminal devices or different operating systems such as IOS/Android, applications, and the like of the devices may be inconsistent, or certain models may report useless data to the server due to adaptation. Such data needs to be processed to generate normalized data with a uniform format.

These additional processing operations on the position information data may be performed at the server side, and do not need to be performed at the client terminal, thus avoiding an addition of a conversion operation to the client terminal, and reducing the power consumption of the client terminal.

After the configuration data of the collection strategy is formed by analyzing the collected position data, the server may update the collection strategy according to the configuration data to form a new updated collection strategy.

At S4, the server sends the updated collection strategy to the client terminal.

The server may send the collection strategy that is updated after the analysis of the position information data to the client terminal. In an exemplary implementation, as mentioned above, the server may send the updated collection strategy to the client terminal in response to receiving a notification message or a request message sent from the client terminal or in response to receiving a push trigger instruction. Alternatively, the server may send the updated collection strategy to the client terminal periodically or when an update cycle of the collection strategy is reached.

At S5, the client terminal receives the updated collection strategy sent by the server, and collects position information according to the updated strategy.

Upon receiving the updated collection strategy, the client terminal may collect position information according to the configuration information in the updated collection strategy. For example, after obtaining the updated collection strategy, the client terminal may discretize the updated collection strategy to configuration corresponding to each integral point, collects data in accordance with requirements associated with collection time interval(s) and collection precision(s) set in the configuration information of the collection strategy, or predetermine or predict a travel route or destination of the user when detecting a position change of the client terminal, such as going home.

The updated collection strategy may include information configured by the server according to the optimized collection strategy obtained by analyzing the position information data collected and reported by the client terminal. The server may intelligently optimize configuration information for information collection and measurement of the client terminal based on the habits of the user acquired by analysis, to reduce the power consumption of the client terminal of the user, which includes the consumption of network traffic, and to solve the problem of high power consumption of traditional passive positioning.

Figure 3:
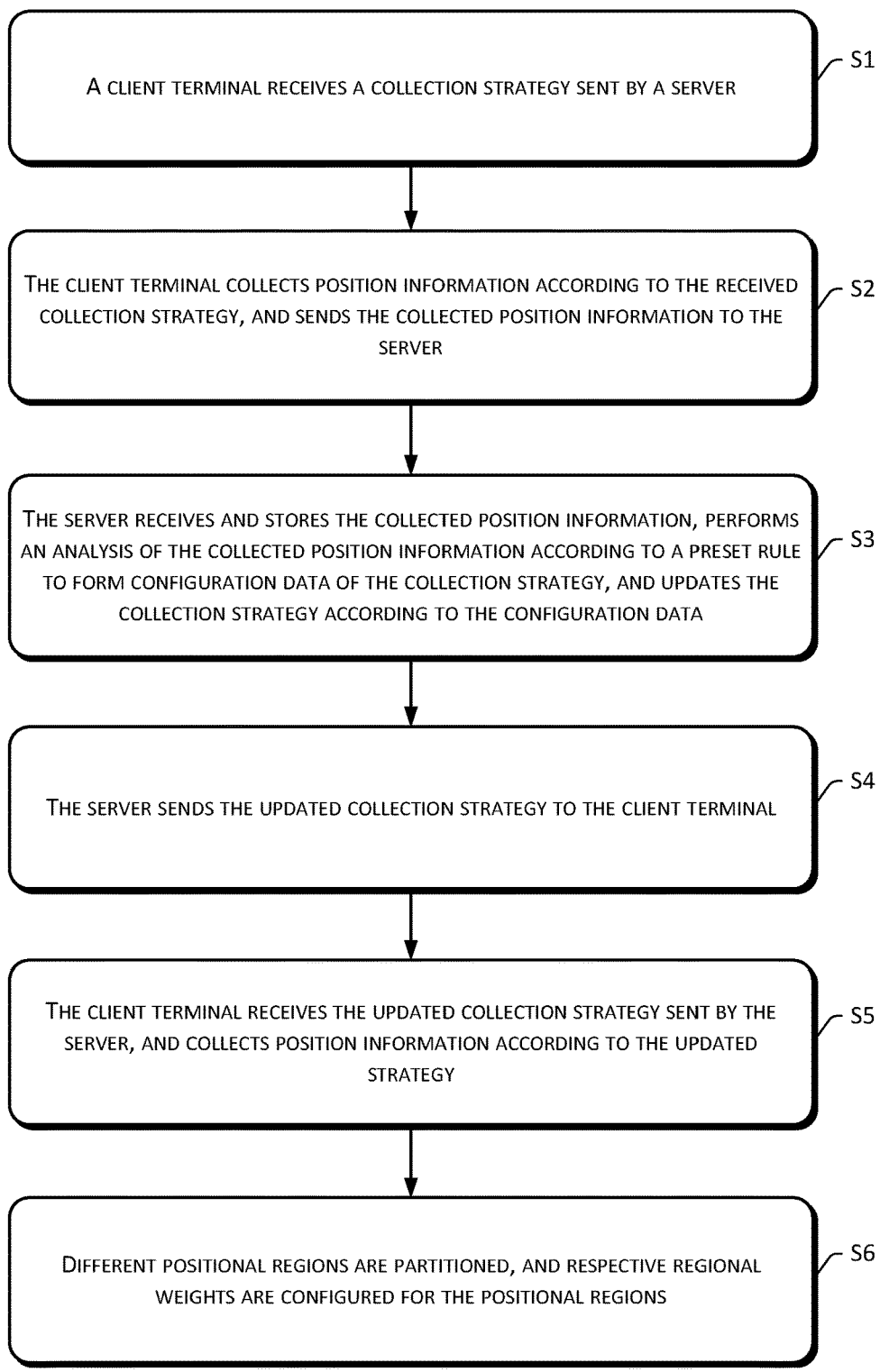
FIG. 3 is a flowchart of an information collection method according to another embodiment of the present disclosure.

In another exemplary embodiment of the example information collection method of the present disclosure, different positional regions may further be partitioned. According to business development, population density, administrative level, etc., of a positional region where the user is located, different weights may be configured for that positional region. When forming the configuration data of the collection strategy, the server may adjust the configuration data of the collection strategy according to the weight of the positional region where the user is located. FIG. 3 shows a flowchart of an information collection method according to another embodiment of the present disclosure. As shown in FIG. 3, the information collection method may further include the following method block.

At S6, different positional regions are partitioned, and respective regional weights are configured for the positional regions.

The server calculates and obtains a current position of the client terminal based on the position information. The server sets the configuration data of the collection strategy according to a regional weight of a positional region corresponding to the current position of the client terminal.

Different positional regions may be partitioned in advance, and different regional weights may be configured for different positional regions by analyzing position information data of users in different regions and/or taking into account of respective population densities, economic development statuses, etc., of the positional regions that are partitioned. For example, the server may acquire data of hotspot business areas of hotspot cities of a country in advance, and may assign higher regional weights for positional regions of the hotspot business areas when optimizing the collection strategy. In this way, when it is known upon determining that the user gets close to or enter into a positional region of a hotspot business area and the positional region of the user changes frequently according to the position information of the user, configuration information of the collection strategy may be adjusted according to an assigned regional weight of the positional region of the hotspot business area, for example, reducing the collection time interval, and increasing the frequency of collecting position information correspondingly, etc. Alternatively, collection precisions in different positional regions may be adjusted, for example, increased from 50 meters for suburb to 20 meters for urban area. Alternatively, the time period for information collection may be adjusted, postponing the time period of collection to 2:00 am when located in downtown in an urban area. Apparently, when the user leaves the positional region of the hotspot business area or returns from the urban area to the suburb, the frequency of collecting position information may be decreased or the time period for information collection may be shortened.

After different positional regions are set up, the server may automatically optimize the collection strategy according to a positional region in which a current position of the user is located, which further optimizes the collection strategy according to the position information of the user in a more reasonable manner, and implements a dynamic and intelligent optimization of information collection.

Apparently, in a further optimization solution, partitioning into different positional regions in the method may include:

partitioning different positional regions, and partitioning at least first-level positional sub-region(s) from the positional regions;

setting up priority levels for positional regions of different levels in advance, or setting up priority levels for the positional regions of different levels based on degrees of activity of the positional regions of different levels that are obtained by analyzing the position information; and setting up collection policies with corresponding priority levels according to the priority levels of the positional regions of different levels, and sending the collection policies with different priority levels to the client terminal.

In an implementation, receiving the updated collection strategy from the server, and collecting the position information according to the updated strategy by the client terminal may include receiving and storing, by the client terminal, collection policies of positional regions with different priority levels, and preferentially using a collection strategy having the highest priority level from among the collection policies corresponding to a current positional region.

In an implementation, for example, different positional regions may be partitioned in advance with cities as units based on administrative levels or population densities of the cities and may be set as first positional regions having priority level A. A city may then be partitioned into positional sub-regions such as urban areas and suburbs, etc., which may be set as second positional regions having priority level AA. Furthermore, the urban area may be partitioned into positional sub-regions such as business areas, residential areas, and administrative areas, etc., which may be set as third positional regions having priority level AAA. The server may send collection strategies with different priority levels to the client terminal in advance. When the user enters a certain positional region, a collection strategy of that positional region may be used. In responses to determining that the user enters into a positional sub-region having a higher priority level, the client terminal may use a collection strategy that has been stored and is associated with the positional sub-region having the higher priority level directly.

For example, when a user C is in an urban area, a collection strategy of the urban area with a priority level AA and a collection strategy of 20 hotspot business areas of the urban area with a priority level AAA may be received and stored. In response to determining that the user is not in a hotspot business area of the urban area, the client terminal may collect position information using the collection strategy with the priority level AA. In response to determining that the user enters into a hotspot business area of the urban area, a stored collection strategy of the hotspot business area with the priority level AAA may be used directly. For example, a time interval for collecting position information for a collection strategy with AAA may be reduced.

In an implementation of partitioning positional sub-regions and setting up priority levels for positional regions of different levels, the server may obtain degrees of activities of the positional regions of different levels by analyzing position information data of users, and set the priority levels for the positional regions of different levels. For example, the server may perform a massive data analysis using position information data that is collected and reported in the past seven days to acquire activities of hotspot areas/business areas, and optimize partitioning of priority levels of positional regions of different levels in real time.

In order to save the storage capacity for collection strateg(ies) of the client terminal, the server may analyze and acquire a region/business area near a location where the user often visits based on the collected position information data. Collection strateg(ies) having a relatively high trigger rate may be preferentially delivered to the client terminal each time when the client terminal synchronizes collection strategies with the server, or delivered to the client terminal at a periodic time interval and stored in the client terminal.

The foregoing embodiment provides an approach of analyzing collected position information data and configuring a collection strategy using time periods or regions according to an analysis result by a server. Apparently, in other embodiments, collection policies for different regions and time periods can be considered in combination. For example, if a collection time interval configured for a certain business area is 10 minutes and a collection time interval configured for a user in a current time period is 20 minutes, a collection strategy may be set as either 20 minutes or 10 minutes according to a self-defined rule when the user enters the business area in the current time period. Specific details may be configured according to associated needs. Collection strategies that are configured based on partitioning of times and positions acquired through an analysis of position information data by the server of the present disclosure and other transformations or variations made thereto without making any creative effort should belong to the scope of the present disclosure.

It should be noted that sending the collected position information from the client terminal to the server may include sending the position information collected according to a collection strategy that is first received from the server to the server, or sending the position information collected according to the updated collection strategy to the server.

Figure 4:
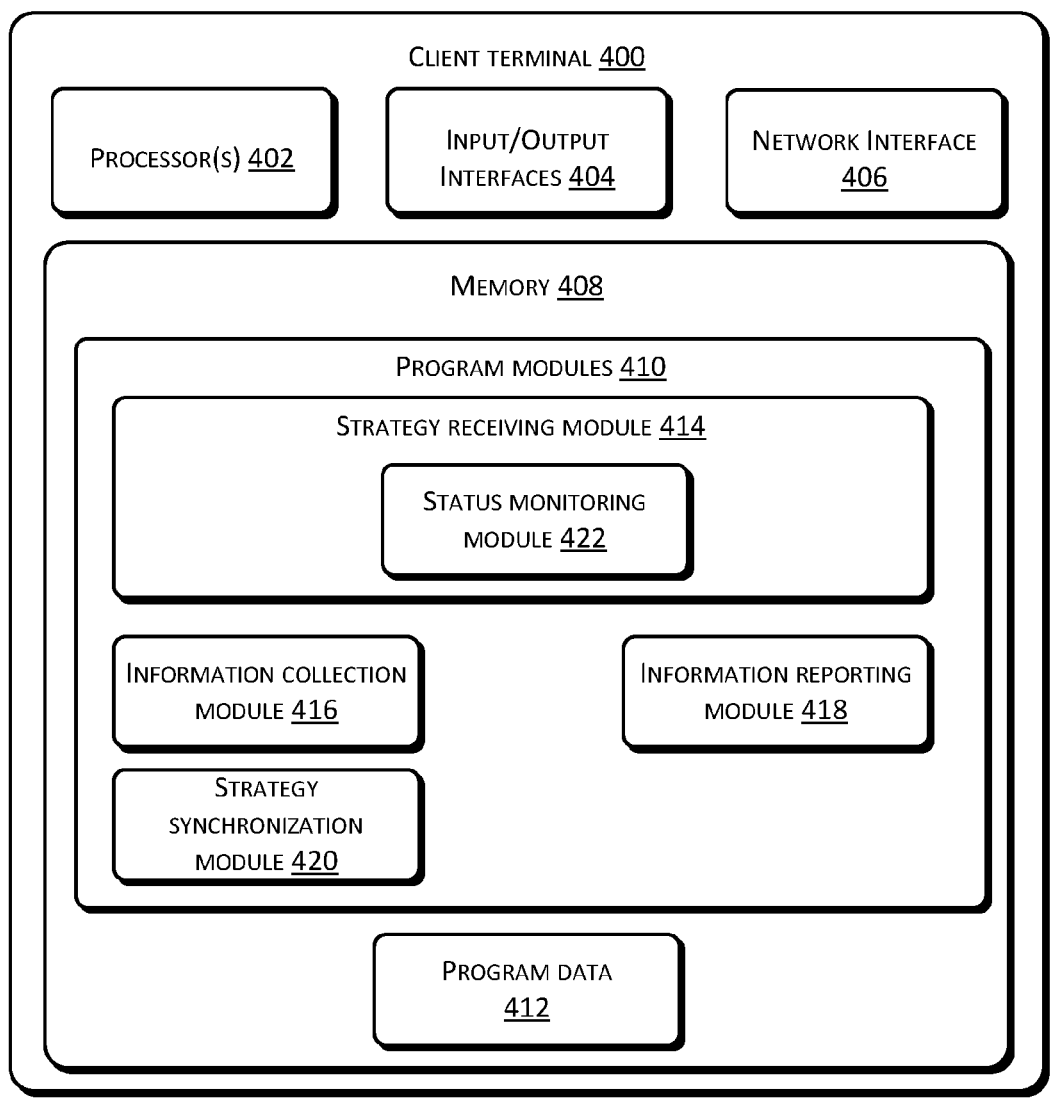
FIG. 4 is a structural diagram of an information collection client terminal according to the present disclosure.

Based on the information collection method of the present disclosure, the present disclosure further provides an information collection client terminal. FIG. 4 is a structural diagram of an information collection client terminal 400 according to the present disclosure. As shown in FIG. 4, the client terminal 400 may include, but is not limited to, one or more processors 402, an input/output (I/O) interface 404, a network interface 406 and memory 408.

The memory 408 may include a form of computer readable media, e.g., a non-permanent storage device, random-access memory (RAM) and/or a nonvolatile internal storage, such as read-only memory (ROM) or flash RAM. The memory 408 is an example of computer readable media.

The computer readable media may include a permanent or non-permanent type, a removable or non-removable media, which may achieve storage of information using any method or technology. The information may include a computer-readable command, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

The memory 408 may include program modules 410 and program data 412. The program modules 410 may include a strategy receiving module 414, an information collection module 416, an information reporting module 418 and a strategy synchronization module 420. The strategy receiving module 414 receives a collection strategy sent by a server. The information collection module 416 collects position information according to the collection strategy in the strategy receiving module 414. The information reporting module 418 sends the collected position information to the server. The strategy synchronization module 420 synchronizes with the server and update the collection strategy received by the strategy receiving module 414.

The information collection client terminal 400 in the present embodiment may collect the position information data according to the collection strategy sent by the server. Apparently, the position information data may include other information, such as a user ID, a collection time, and so on. In particular, the client terminal 400 in the present embodiment may also synchronize collection strateg(ies) with the server to obtain a collection strategy that is optimized by the server, which is able to collect position information intelligently according to the habits of the user, and thus save the power of the client terminal 400.

In an embodiment, the collection strategy updated by the strategy synchronization module 420 may include:
  reducing a time interval for collecting and reporting the position information for an overlapping time period during which daily changes in positions reach a preset frequency; and
  increasing a time interval for collecting and reporting the position information for an overlapping time period during which daily changes in positions do not reach the preset frequency.

A time interval for reporting is shortened when the position changes frequently and is increased in a time period of inactiveness, thus using limited power in most effective time period(s) and saving the power of the user terminal to the largest extent.

In an embodiment, the strategy receiving module 414 may include a status monitoring module 422 configured to send a notification message to the server in response to detecting that the client terminal starts or switches to a particular application.

Correspondingly, the strategy receiving module 414 receiving the collection strategy sent by the server may include: the strategy receiving module 414 receiving the collection strategy that is sent by the server after sending the notification message.

Figure 5:
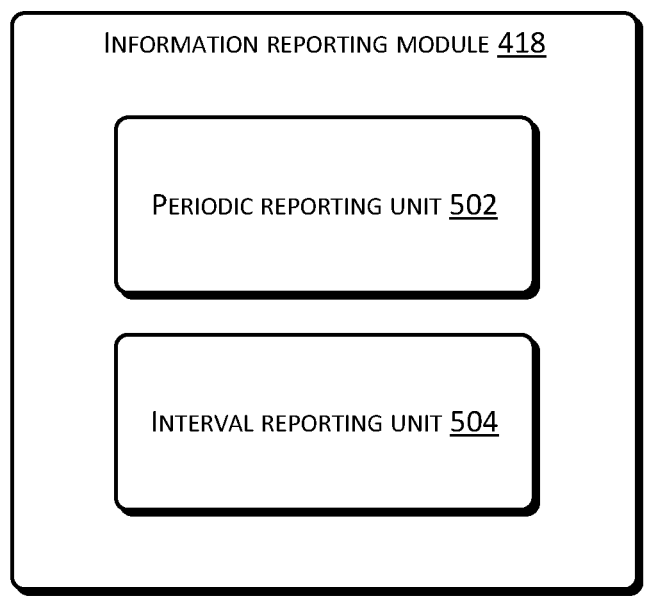
FIG. 5 is a structural diagram of an information reporting module in the client terminal according to the present disclosure.

FIG. 5 is a structural diagram of the information reporting module 418 in the client terminal 400 according to the present disclosure. As shown in FIG. 5, the information reporting module 418 that sends the collected position information to the server may include a periodic reporting unit 502 that may obtain time(s) for reporting information, Tup, that is/are configured in the information collection strategy, and send the collected position information to the server in response to the time(s) for reporting information, Tup, being reached. Additionally or alternatively, the information reporting module 418 may include an interval reporting unit 504 that may acquire a time interval for reporting information that is configured in the information collection strategy, and the client terminal sends the collected position information to the server in response to determining that a time lapse from a previous time of reporting position information is greater than the time interval for reporting information, Tus.

Figure 6:
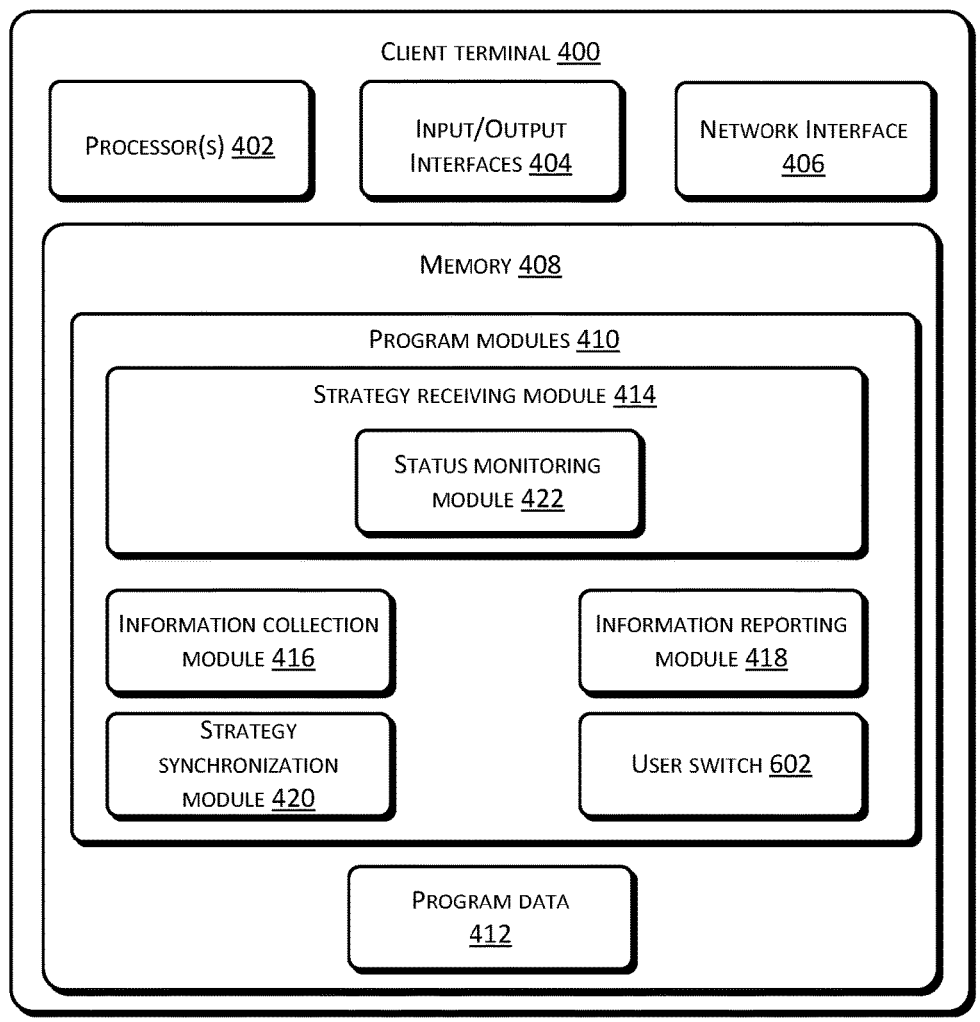
FIG. 6 is a structural diagram of an information collection client terminal according to another embodiment of the present disclosure.

FIG. 6 is a structural diagram of the information collection client terminal 400 according to another embodiment of the present disclosure. As shown in FIG. 6, the client terminal 400 may further include a user switch 602 that is configured to set whether the information collection module 416 is allowed to collect the position information and/or is configured to set whether the information report module 418 is allowed to send the collected position information to the server.

In an embodiment, the user switch 602 is set to facilitate the user to configure whether the client terminal 400 is allowed to collect or report information at any time, and to stop collecting or reporting the position information at the client terminal 400 through the user switch 602 when the user considers that the information collection or reporting is not needed, thus enabling the user to possess more autonomous right and saving the power of the client terminal 400.

Figure 7:
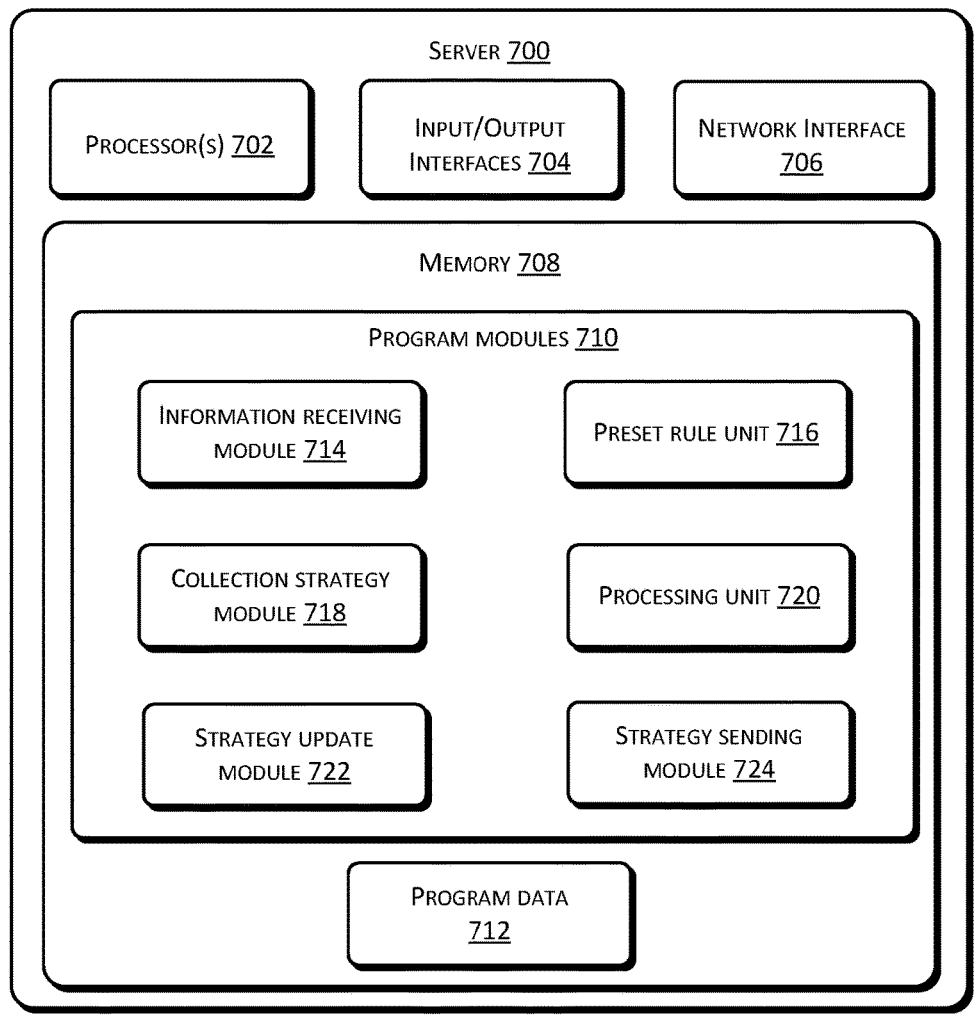
FIG. 7 is a structural diagram of a collected information processing server according to the present disclosure.

The present disclosure further provides an information collection and processing server. FIG. 7 is a structural diagram of a collected information processing server 700 according to the present disclosure. As shown in FIG. 7, the server 700 may include, but is not limited to, one or more processors 702, an input/output (I/O) interface 704, a network interface 706 and memory 708.

The memory 708 may include a form of computer readable media, e.g., a non-permanent storage device, random-access memory (RAM) and/or a nonvolatile internal storage, such as read-only memory (ROM) or flash RAM. The memory 708 is an example of computer readable media as described in the foregoing description.

The memory 708 may include program modules 710 and program data 712. The program modules 710 may include an information receiving module 714, a preset rule unit 716, a collection strategy module 718, a processing unit 720, a strategy update module 722 and a strategy sending module 724. The information receiving module 714 receives and stores position information sent from a client terminal. The preset rule unit 716 stores a preset rule that is determined in advance for analyzing the position information. The collection strategy module 718 stores a collection strategy of the client terminal. The processing unit 720 executes a preset rule stored by the preset rule unit 716, and analyzes the position information to obtain configuration data of the collection strategy. The strategy update module 722 obtains the configuration data of the collection strategy to update the collection strategy in the collection strategy module 718. The strategy sending module 724 sends the collection strategy stored in the collection strategy module 718 to the client terminal.

In an embodiment, the collected information processing server 700 may optimize and update the collection strategy of the client terminal based on an analysis of the position information data of the client terminal to reduce the power consumption of passive positioning of the client terminal. In an example embodiment, the collection strategy updated by the strategy update module 722 according to the configuration data acquired by analyzing the preset rule may include:

reducing a time interval for collecting and reporting the position information for an overlapping time period during which daily changes in positions reach the preset frequency; and increasing a time interval for collecting and reporting the position information for an overlapping time period during which daily changes in positions do not reach the preset frequency.

Figure 8:
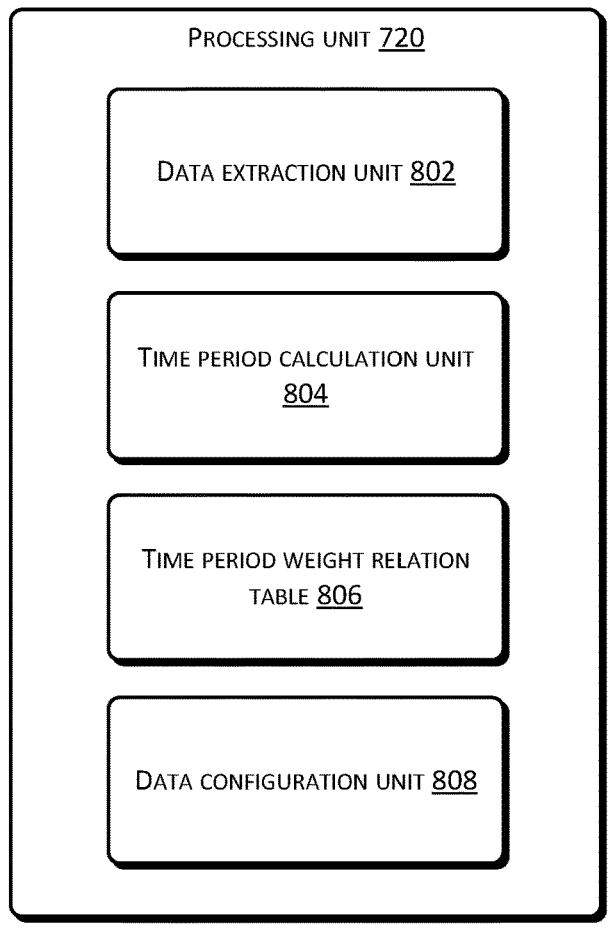
FIG. 8 is a structural diagram of a processing unit according to the present disclosure.

FIG. 8 is a structural diagram of the processing unit 720 according to the present disclosure. As shown in FIG. 8, the processing unit 720 may include:

a data extraction unit 802 configured to periodically extract position information data in N days, where N≥1;

a time period calculation unit 804 configured to obtain overlapping time period(s) during which positions of the client terminal changes on a daily basis at a frequency that reaches a preset frequency within the N days based on the position information data;

a time period weight relation table 806 configured to set up activity weight(s) for the obtained overlapping time period(s), and establish a corresponding relationship between activity weights and information collection time intervals in different time periods;

a data configuration unit 808 configured to set the configuration data of the collection strategy based on the corresponding relationship between the activity weights and the information collection time intervals in the different time periods.

In an embodiment, different collection time intervals may be set up according to degrees of activeness of position changes of the user client terminal in different periods of time. An example of the time weight relation table may be referenced to a corresponding relationship in Table 1, which is not repeatedly described herein.

In another implementation, based on the habits of most users in one week, periodically extracting the position information data in the N days by the data extraction unit 802 may include periodically extracting the position information data in seven days by the data extraction unit 802.

Figure 9:
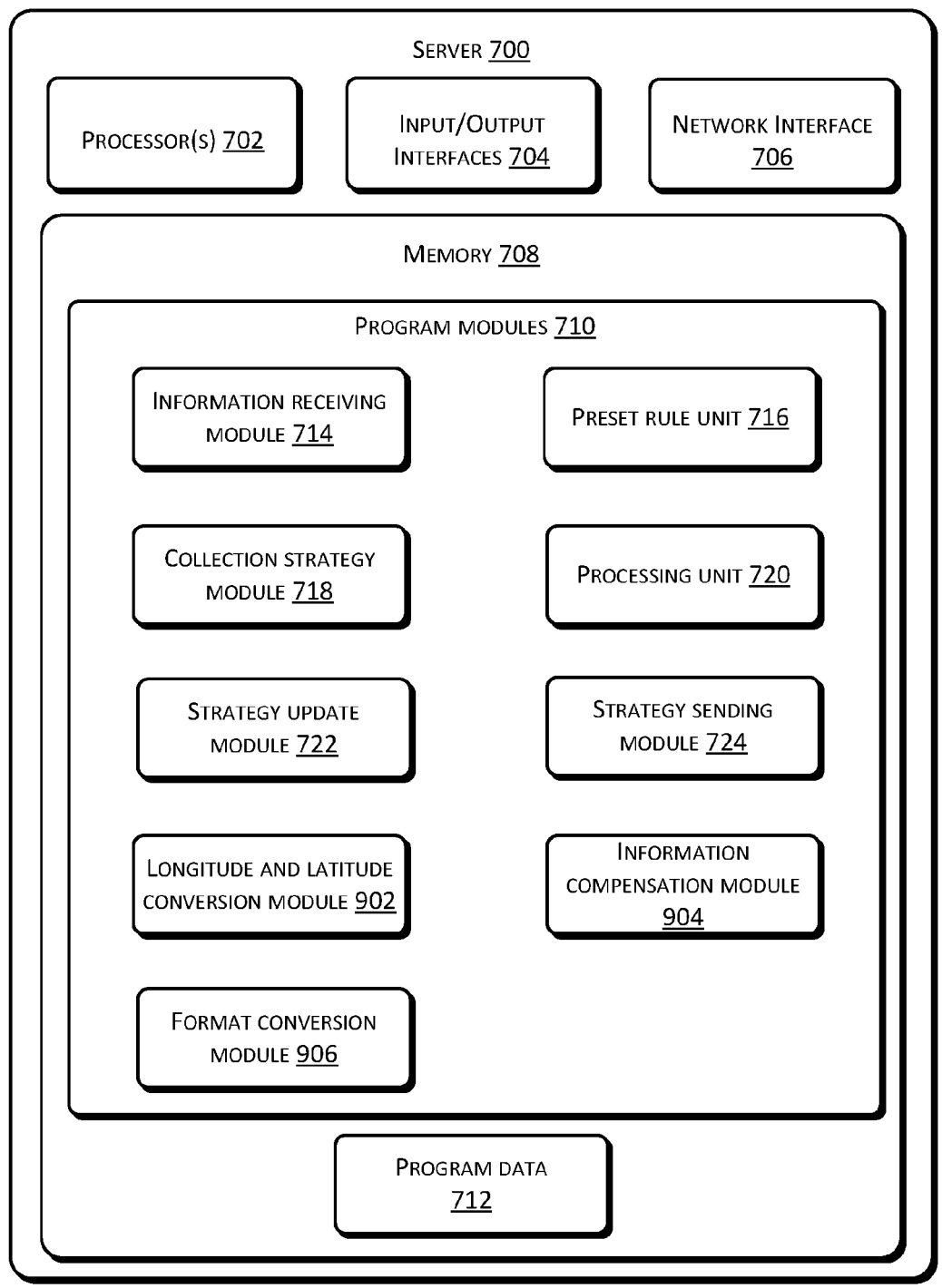
FIG. 9 is a structural diagram of a collected information processing server according to another embodiment of the present disclosure.

FIG. 9 is a structural diagram of the collected information processing server 700 according to another embodiment of the present disclosure. As shown in FIG. 9, the server 700 may include at least one of:

a longitude and latitude conversion module 902 configured to convert longitude and latitude information in the position information into a standard format that conforms to a processing requirement;

an information compensation module 904 configured to fill in the position information data when particular field(s) in the position information is/are empty or has/have abnormal value(s);

a format conversion module 906 configured to convert the position information data into a unified data format.

Additional calculation, compensation and format conversion on the data are set to be performed at the server side to alleviate data processing operations of the client terminal and further decrease the power consumption of the client terminal.

Figure 10:
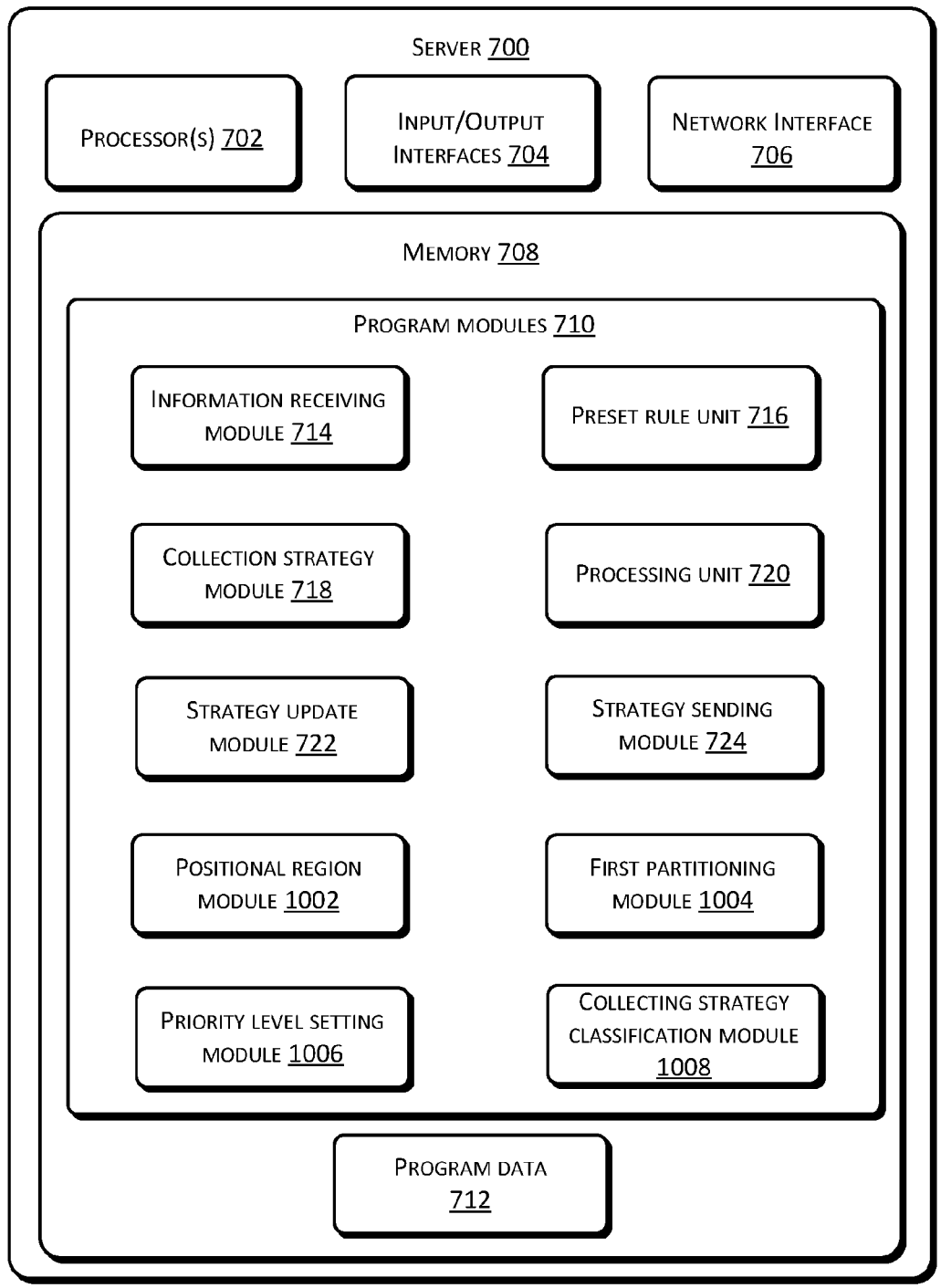
FIG. 10 is a structural diagram of a collected information processing server according to another embodiment of the present disclosure.

FIG. 10 is a structural diagram of the collected information processing server 700 according to another embodiment of the present disclosure. As shown in FIG. 10, the server 700 may further include a positional region module 1002 configured to perform partitioning of different positional regions, assign corresponding regional weights to the positional regions, calculate a current position of the client terminal, and set the configuration data of the collection strategy according to a regional weight of a positional region corresponding to the current position of the client terminal.

Different positional regions may be partitioned in advance, and different region weights may be configured for different positional regions by analyzing position information data of users in different regions and/or taking into account of respective population densities, economic development statuses, etc., of the positional regions that are partitioned. After different positional regions are set up, the server 700 may automatically optimize the collection strategy according to a positional region in which a current position of the user is located, which further optimizes the collection strategy according to the position information of the user in a more reasonable manner, and achieves a dynamic and intelligent optimization of information collection.

In another embodiment of partitioning of positional regions, the server 700 may perform partitioning of positional regions of different levels according to an analysis of the collected position information, and assign corresponding priority levels for the positional regions of different levels according to degrees of activity of hotspot/business areas acquired through the analysis. Thus, in another embodiment, the server 700 may further include:

- a first partitioning module 1004 configured to partition different positional regions, and partition at least first-level positional sub-region(s) from the positional regions;
- a priority level setting module 1006 configured to preset respective priority levels for the positional regions of different levels, or set up the respective priority levels for the positional regions of different levels according to respective degrees of activity of the positional regions of different levels acquired after analyzing the position information by the processing unit 720;
- a collection strategy classification module 1008 configured to set collection policies with corresponding priority levels according to the respective priority levels of the positional regions of different levels, and send the collection policies of different priority levels to the client terminal.

In an embodiment, the server 700 may configure different collection policies for the positional regions of different priority levels. The client terminal may store the collection policies for the positional regions of different priority levels in advance. The positional regions of different priority levels may be partitioned gradually according to areas of regions in advance. For example, a city level may include a county level, and the county level may further be partitioned into a business area level, which may also be partitioned based on an analysis of the collected position information data. Therefore, different collection policies may be configured based on respective actual population densities, degrees of activity associated with respective hots pots, etc., of the positional regions of different priority levels, thus allowing optimization of collection policies in more reasonable and intelligent manner, achieving a dynamic adjustment of collection by the client terminal, and further saving the power of the client terminal.

In an embodiment, the server 700 may send the collection strategy to the client terminal. In an implementation, the server 700 may send the collection strategy to the client terminal in response to receiving a notification message or a synchronization request message sent by the client terminal. Additionally or alternatively, the server 700 may send the collection strategy to the client terminal after a preset push time is reached. Apparently, the server 700 may also send the collection strategy upon receiving a push trigger instruction issued by an operator on the server in real time.

Figure 11:
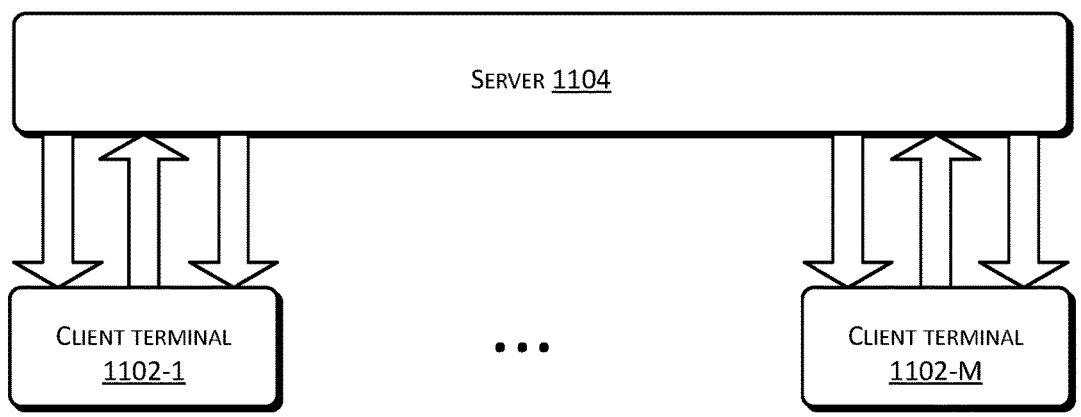
FIG. 11 is a structural diagram of an information collection system according to the present disclosure.

A data collection system may analyze position information collected by a client terminal and optimize a collection strategy of the client terminal intelligently to reduce the power consumption of the client terminal. FIG. 11 is a structural diagram of an information collection system 1100 according to the present disclosure. As shown in FIG. 11, the information collection system 1100 may include one or more client terminals 1102-1, . . . , 1102-M (collectively referred to as client terminal 1102, such as the client terminal 400) and a server 1104 (such as the server 700), where M is a positive integer greater than zero. The client terminal 1102 receives a collection strategy from the server 1104, collects position information according to the received collection strategy, send the collected position information to the server 1104, received an updated collection strategy from the server 1104, and collect the position information according to the updated strategy. The server 1104 receives and stores the collected position information, performs an analysis of the collected position information according to a preset rule to form configuration data of the collection strategy, and update the collection strategy according to the configuration data formed by the analysis, and send the updated collection strategy to the client terminal 1102.

The present disclosure provides a method, a client terminal and a server of collecting and processing information. By obtaining a collection strategy that is optimized by the server according to user behavior and habits, the client terminal is able to adjust collection times, collection intervals and collection precisions, etc., of position information of a terminal of a user timely and reasonably, thereby achieving a real-time personalization. On the other hand, by performing data analysis of the collected position information, the server is able to calculate an active time period in which a position of the user changes frequently, and to properly increase a passive positioning frequency during that active time period, while the opposite or even no collection is performed in other time periods. By learning the habits of the user, information collection in the passive positioning becomes intelligent, which gradually optimizes a configuration strategy of the position information collection, and greatly saves the power and the network traffic of the user terminal, thus improving the use experience in passive positioning applications.

Although the present disclosure describes transmissions, channel field settings, etc., between a client terminal and a server, and Windows, Android, or iOS development platform, the present disclosure is not limited to situations in which complete compliance with a standard communication protocol or a development platform design standard is needed. Transmission mechanisms or development platforms modified based on a certain protocol or development platform may also be able to implement the solutions included in the embodiments of the present disclosure. Apparently, even if a private protocol or other development platform rather than the above communication protocol or development platform is adopted, the present disclosure can also be implemented as long as the above methods of information interaction and information determination and feedback in the embodiments of the present disclosure are satisfied, which is not repeatedly described herein.

The apparatuses, modules or units illustrated in the foregoing embodiments may be implemented by a computer chip or an entity, or a product having a certain type of function. For the sake of description, the above apparatuses are functionally divided into various types of modules for individual descriptions. Apparently, when implementing the present disclosure, the functions of a number of modules may be implemented in one or more instances of software and/or hardware, or modules implementing the same function may be implemented by a combination of a plurality of sub-modules or sub-units. For example, the user switch may be configured with two switch apparatuses to control whether to allow information collection or reporting respectively, or the switch apparatuses may be combined into a single functional module to control whether to allow information collection and reporting.

One skilled in the art also knows that, in addition to implementing a controller via pure computer readable programming codes, the controller may also realize the same function in a form of a logic gate, a switch, an application-specific integrated circuit, a programmable logic controller, and an embedded microcontroller, etc., using logic programming of the method blocks. Therefore, this type of controller may be regarded as a hardware component, and apparatus(es) therein that is/are used for realizing various types of functions may also be regarded as an internal structure of the hardware component. Alternatively, apparatus(es) used for realizing various types of functions may even be regarded either as software module(s) for realizing a method or an internal structure of a hardware component.

The present disclosure may be described in a general context of computer-executable instructions executed by a computing device, such as a program module. Generally, a program module may include routines, programs, objects, modules, and data structure, etc., for executing particular tasks or implementing particular abstract data types. The present disclosure may also be implemented in a distributed computing environment. In a distributed computing environment, a task is executed by remote processing device{s} which is/are connected through a communication network. In a distributed computing environment, a program module may be located in storage media (which include storage devices) of local and remote computing devices.

From the foregoing description of the embodiments, one skilled in the art can clearly understand that the present disclosure can be implemented via software and general hardware platform that is needed. Based on this understanding, the essence of the technical solutions of the present disclosure or the portions of the present disclosure that makes contribution to the existing technologies can be embodied in the form of a computer software product that is stored in storage media, such as ROM/RAM, diskette, optical disk, etc., and includes multiple instructions that instruct a computing device (which may include a personal computer, a mobile terminal, a server, a network device, etc.) to perform the methods described in the embodiments or part of the embodiments of the present disclosure.

The embodiments in the present disclosure are described in a progressive manner. The same or similar portions between different embodiments may be referenced with one another. Emphasis of each embodiment is different from those of the other embodiments. The present disclosure may be used in an environment or configuration of universal or specialized computer systems. Examples include a personal computer, a server computer, a handheld device or a portable device, a tablet device, a multi-processor system, a microprocessor-based system, a set-up box, a programmable electronic device, a network PC, a small-scale computer, a large-scale computer, and a distributed computing environment including any system or device as described above.

Although the present disclosure is described using the foregoing embodiments, one of ordinary skill in the art should understand that the present disclosure may be altered or modified in many different ways without departing from the spirit of the present disclosure. These modifications and variations are covered in the scope of protection of the appended claims without departing from the spirit of the present disclosure.

The invention claimed is:

1. A method implemented by a client terminal, the method comprising:
    collecting position information through a Global Positioning System (GPS) according to a first collection strategy;
    sending the collected position information to a server;
    receiving a second collection strategy from the server, the second collection strategy comprising:
        reducing a first time interval for collecting and reporting the position information for one or more overlapping time periods during which daily changes in positions reach a preset frequency, and
        increasing a second time interval for collecting and reporting the position information for another one or more overlapping time periods during which the daily changes in positions do not reach the preset frequency; and
    collecting the position information through the GPS according to the second collection strategy.

2. The method of claim 1, further comprising receiving the first collection strategy prior to collecting the position information according to the first collection strategy.

3. The method of claim 2, wherein receiving the first collection strategy comprises:
    sending a notification message to the server in response to the client terminal initiating or switching to a specified application;
    receiving the first collection strategy from the server after sending the notification message to the server.

4. The method of claim 2, wherein receiving the first collection strategy comprises one or more of:
    receiving the first collection strategy from the server in response to a preset push time being reached; or
    receiving the first collection strategy from the server based on a push trigger instruction.

5. The method of claim 1, wherein sending the collected position information to the server comprises:
    obtaining a time for reporting information from the first collection strategy; and
    sending the collected position information to the server in response to the time for reporting information being reached.

6. The method of claim 1, wherein sending the collected position information to the server comprises:
    obtaining a time interval for reporting information from the information collection strategy; and
    sending the collected position information to the server in response to determining that a time lapse from a previous time of reporting position information is greater than the time interval for reporting information.

7. The method of claim 1, wherein receiving the second collection strategy comprises:

receiving and storing a plurality of collection policies of different priority levels for positional regions; and selecting a collection strategy having a highest priority level from among the plurality of collection policies corresponding to a current positional region where the client terminal is located as the second collection strategy.

8. The method of claim 1, further comprising setting up an indicator state of whether an information collection or an information report is allowed at the client terminal.

9. The method of claim 8, wherein collecting the position information according to the first collection strategy is performed when the indicator state shows that the information collection is allowed, and wherein sending the collected position information to the server is performed when the indicator state shows that the information report is allowed.

10. One or more computer-readable media storing executable instructions that, when executed by a server, cause the server to perform acts comprising:
receiving and storing position information that is sent from a client terminal, the position information being obtained by a Global Positioning System (GPS) of the client terminal;
performing an analysis of the collected position information according to a preset rule to form configuration data of a collection strategy, wherein performing the analysis of the collected position information comprises:
periodically extracting position information data in N days, wherein N≥1;
calculating one or more overlapping time periods during which positions of the client terminal changes on a daily basis at a frequency that reaches a preset frequency within the N days based on the position information data;
setting up respective one or more activity weights for the one or more overlapping time periods that are obtained, and setting up one or more information collection time intervals corresponding to the respective one or more activity weights; and
setting the configuration data of the collection strategy based on the respective one or more activity weights of the one or more overlapping time periods and the one or more information collection time intervals corresponding to the respective one or more activity weights;
updating the collection strategy according to the configuration data that is formed by the analysis; and
sending the updated collection strategy to the client terminal.

11. The one or more computer-readable media of claim 10, the acts further comprising performing at least one of longitude and latitude conversion, information compensation, and data format calibration on the position information.

12. The one or more computer-readable media of claim 10, the acts further comprising:
obtaining different positional regions by partitioning, and setting up corresponding regional weights for the different positional regions; and
obtaining a current position of the client terminal based on the position information, and setting the configuration data of the collection strategy according to a regional weight of a positional region corresponding to the current position of the client terminal.

13. The one or more computer-readable media of claim 10, the acts further comprising:

obtaining different positional regions by partitioning, and obtaining at least first-level positional sub-regions from the positional regions;
setting up priority levels for positional regions of different levels in advance, or setting up priority levels for the positional regions of different levels based on degrees of activity of the positional regions of different levels; and
setting up collection policies with corresponding priority levels according to the priority levels of the positional regions of different levels, and sending the collection policies with different priority levels to the client terminal.

14. The one or more computer-readable media of claim 10, wherein, the updated collection strategy comprises:
reducing a first time interval for collecting and reporting the position information for one or more overlapping time periods during which daily changes in positions reach a preset frequency; and
increasing a second time interval for collecting and reporting the position information for another one or more overlapping time periods during which the daily changes in positions do not reach the preset frequency.

15. An apparatus comprising:
one or more processors;
memory;
a Global Positioning System (GPS);
a strategy receiving module stored in the memory and executable by the one or more processors to receive a collection strategy from a server;
an information collection module stored in the memory and executable by the one or more processors to collect position information through the GPS according to the collection strategy received by the strategy receiving module;
an information reporting module stored in the memory and executable by the one or more processors to send the collected position information to the server; and
a strategy synchronization module stored in the memory and executable by the one or more processors to synchronize with the server to update the collection strategy, the updated collection strategy comprising:
reducing a first time interval for collecting and reporting the position information for one or more overlapping time periods during which daily changes in positions reach a preset frequency, and
increasing a second time interval for collecting and reporting the position information for another one or more overlapping time periods during which the daily changes in positions do not reach the preset frequency.

16. The apparatus of claim 15, wherein the strategy receiving module comprises a status monitoring module to send a notification message to the server in response to detecting that a particular application is started or switched.

17. The apparatus of claim 15, wherein the information reporting module comprises:
a periodic reporting unit to obtain one or more times for reporting information from the collection strategy, and send the collected position information to the server in response to a time of the one or more times being reached; and
an interval reporting unit to obtain a time interval for reporting information from the collection strategy, and send the collected position information to the server in response to determining that a time lapse from a previous time of reporting position information is greater than the time interval for reporting information.

\* \* \* \* \*